United States Patent
Anzai

(10) Patent No.: US 9,451,565 B2
(45) Date of Patent: Sep. 20, 2016

(54) WIRELESS COMMUNICATION APPARATUS

(71) Applicant: FUJITSU LIMITED, Kawasaki-shi, Kanagawa (JP)

(72) Inventor: Naozumi Anzai, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/835,598

(22) Filed: Aug. 25, 2015

(65) Prior Publication Data

US 2016/0066286 A1 Mar. 3, 2016

(30) Foreign Application Priority Data

Aug. 28, 2014 (JP) ................................. 2014-174426

(51) Int. Cl.
*H04W 52/38* (2009.01)
*H04W 52/14* (2009.01)
*H04W 52/24* (2009.01)
*H04W 52/28* (2009.01)

(52) U.S. Cl.
CPC .......... *H04W 52/38* (2013.01); *H04W 52/146* (2013.01); *H04W 52/246* (2013.01); *H04W 52/283* (2013.01); *H04W 52/285* (2013.01)

(58) Field of Classification Search
CPC ............................... H04W 52/38; H04B 1/04
USPC ...................... 455/127.1, 67.11, 522, 69, 126
See application file for complete search history.

(56) References Cited

U.S. PATENT DOCUMENTS

2010/0145611 A1* 6/2010 Tokue ................. B60R 11/0258
701/532
2012/0276861 A1* 11/2012 Isobe ..................... G06F 1/1626
455/127.1
2014/0086600 A1* 3/2014 Cui ......................... G03G 21/20
399/33

FOREIGN PATENT DOCUMENTS

JP 2011-211606 10/2011
JP 2012-235184 11/2012

* cited by examiner

*Primary Examiner* — John J Lee
(74) *Attorney, Agent, or Firm* — Maschoff Brennan

(57) ABSTRACT

A wireless communication apparatus including a first sensor and a second sensor, the apparatus includes: a memory; and a processor coupled to the memory, configured to: input a detection value of the first sensor and a detection value of the second sensor; determine whether or not an object that is located at the wireless communication apparatus exists, based on the detection value of the first sensor; determine a gradient of the wireless communication apparatus, based on the detection value of the second sensor; and regulate transmit power of a radio wave, based on the determination by the first sensor.

5 Claims, 8 Drawing Sheets

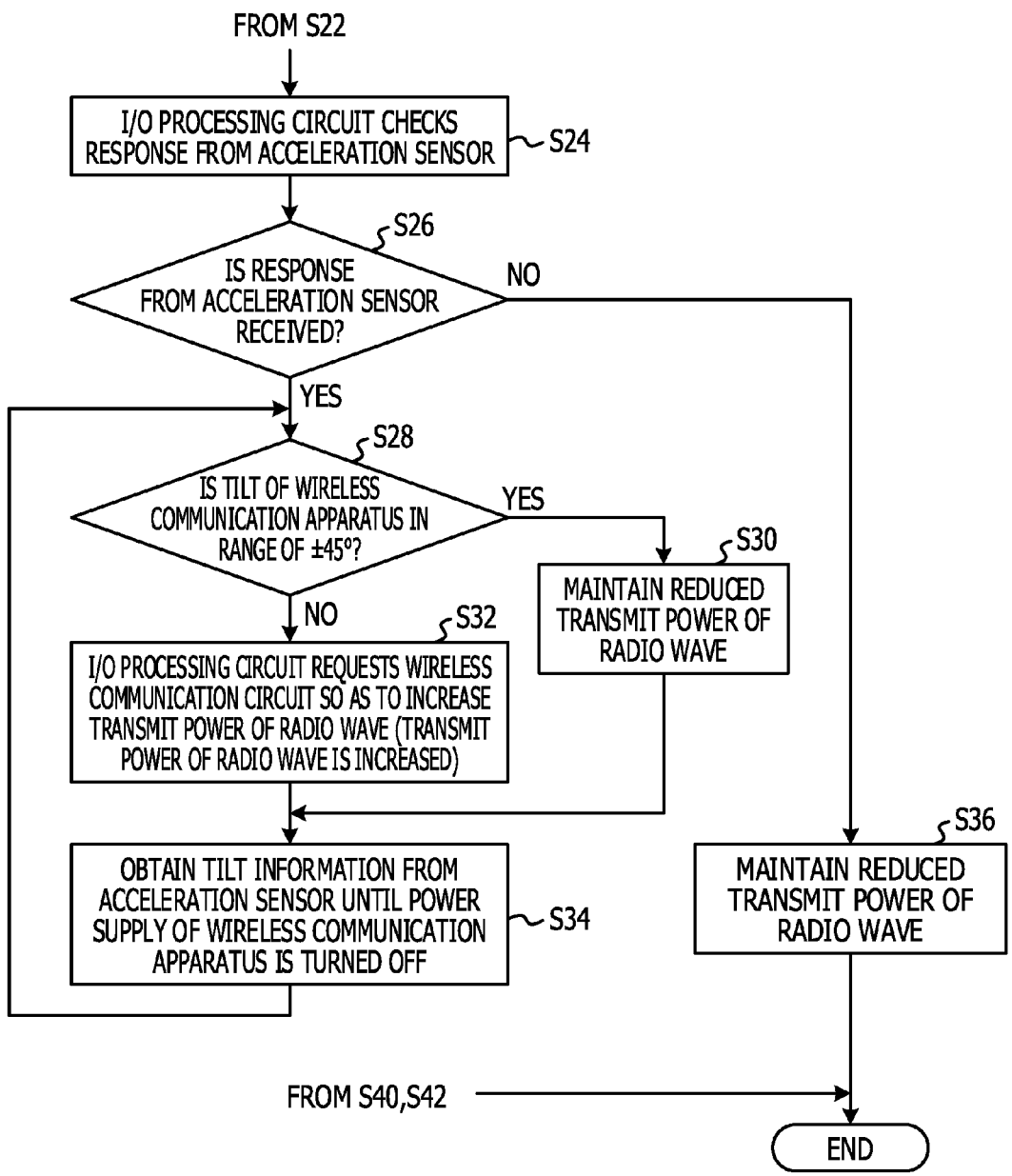

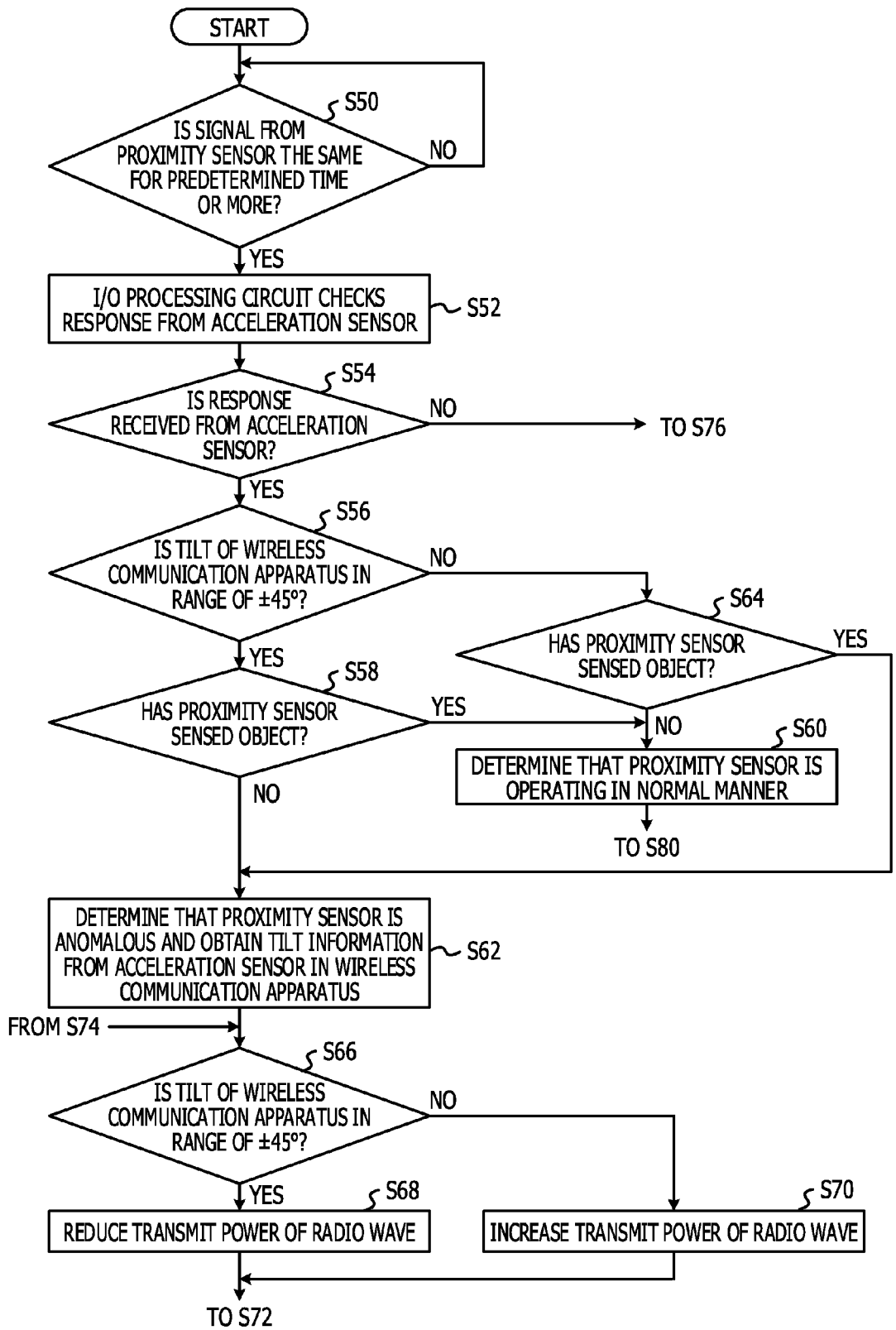

WIRELESS COMMUNICATION APPARATUS

CROSS-REFERENCE TO RELATED APPLICATION

This application is based upon and claims the benefit of priority of the prior Japanese Patent Application No. 2014-174426, filed on Aug. 28, 2014, the entire contents of which are incorporated herein by reference.

FIELD

The embodiments discussed herein are related to a wireless communication apparatus.

BACKGROUND

The human body may be adversely affected depending on the strengths of radio waves (the strengths may also be referred to hereinafter as "transmit power of radio waves" or "radio-wave output") output by wireless communication apparatuses, such as mobile phones, tablet terminals, and notebook personal computers (PCs). Accordingly, with respect to the transmit power of radio waves of wireless communication apparatuses, permissible ranges are specified in individual countries, for example, based on a specific absorption rate (SAR). The SAR refers to the amount of energy absorbed by tissue per unit mass in a unit time and represents how much energy the human body receives in a certain time from equipment that emits a radio wave.

As a method that complies with the SAR specification, there is a method for performing wireless communication at a radio-wave output level within the permissible range of the SAR by reducing the transmit power of a radio wave of a wireless communication apparatus in advance. There is also a method for reducing the transmit power of a radio wave of a wireless communication apparatus when a communication antenna of the wireless communication apparatus approaches near the human body.

With the former method, that is, the method for performing communication while reducing the transmit power of the radio wave of the wireless communication apparatus in advance, it is possible to comply with the SAR standard, but there are cases in which the output level of the radio wave which is requested by mobile phone companies in each country is not satisfied. In the case of a wireless wide-area network (WWAN), when the transmit power of the radio wave is reduced on a regular basis, the communication arrival distance is reduced. In order to overcome the problem, the latter communication method, that is, the method for reducing the transmit power of the radio wave of the wireless communication apparatus when the communication antenna of the wireless communication apparatus approaches near the human body, is employed.

In order to determine the state of the wireless communication apparatus, for example, whether or not the human body approaches near the wireless communication apparatus, a sensor may be used. This technology is disclosed in, for example, Japanese Laid-open Patent Publication No. 2012-235184. For example, when a proximity sensor is provided in the wireless communication apparatus, whether or not an object has approached near the communication antenna of the wireless communication apparatus can be determined based on a detection value of the proximity sensor.

In particular, with respect to sensing using a proximity sensor, for example, electronic communication specifications managed by the Federal Communications Commission (FCC) in the United States define a method for sensing whether or not a wireless communication apparatus has approached near the human body. The method for sensing whether or not a wireless communication apparatus has approached near the human body, the method being defined by the electronic communication specifications, involves using a proximity sensor and ensuring that the human body is not affected when the proximity sensor is broken.

SUMMARY

According to an aspect of the invention, an apparatus includes: a memory; and a processor coupled to the memory, configured to: input a detection value of the first sensor and a detection value of the second sensor; determine whether or not an object that is located at the wireless communication apparatus exists, based on the detection value of the first sensor; determine a gradient of the wireless communication apparatus, based on the detection value of the second sensor; and regulate transmit power of a radio wave, based on the determination by the first sensor.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 5A and 5B illustrate a flowchart illustrating power control processing performed by the wireless communication apparatus according to a first embodiment; and FIGS. 6A and 6B illustrate a flowchart illustrating power control processing performed by the wireless communication apparatus according to a second embodiment.

DESCRIPTION OF EMBODIMENTS

Figure 1:
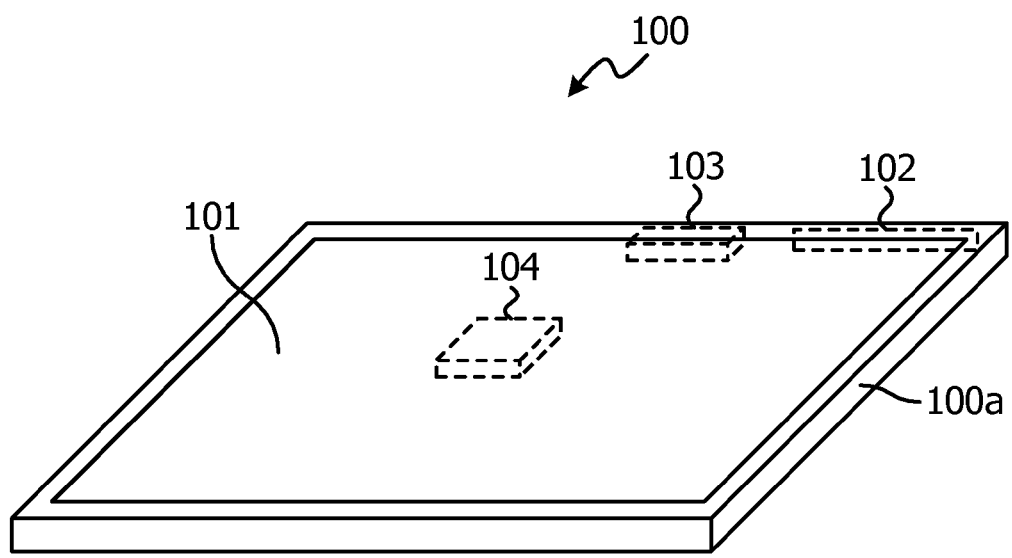
FIG. 1 is a schematic view of an example of the outer shape of a wireless communication apparatus according to one embodiment.

Embodiments of the present disclosure will be described below with reference to the accompanying drawings. Herein and in the accompanying drawings, constituent elements including substantially the same functional configuration are denoted by the same reference numerals, and redundant descriptions are not given.

[Overview of Wireless Communication Apparatus]

Figure 2:
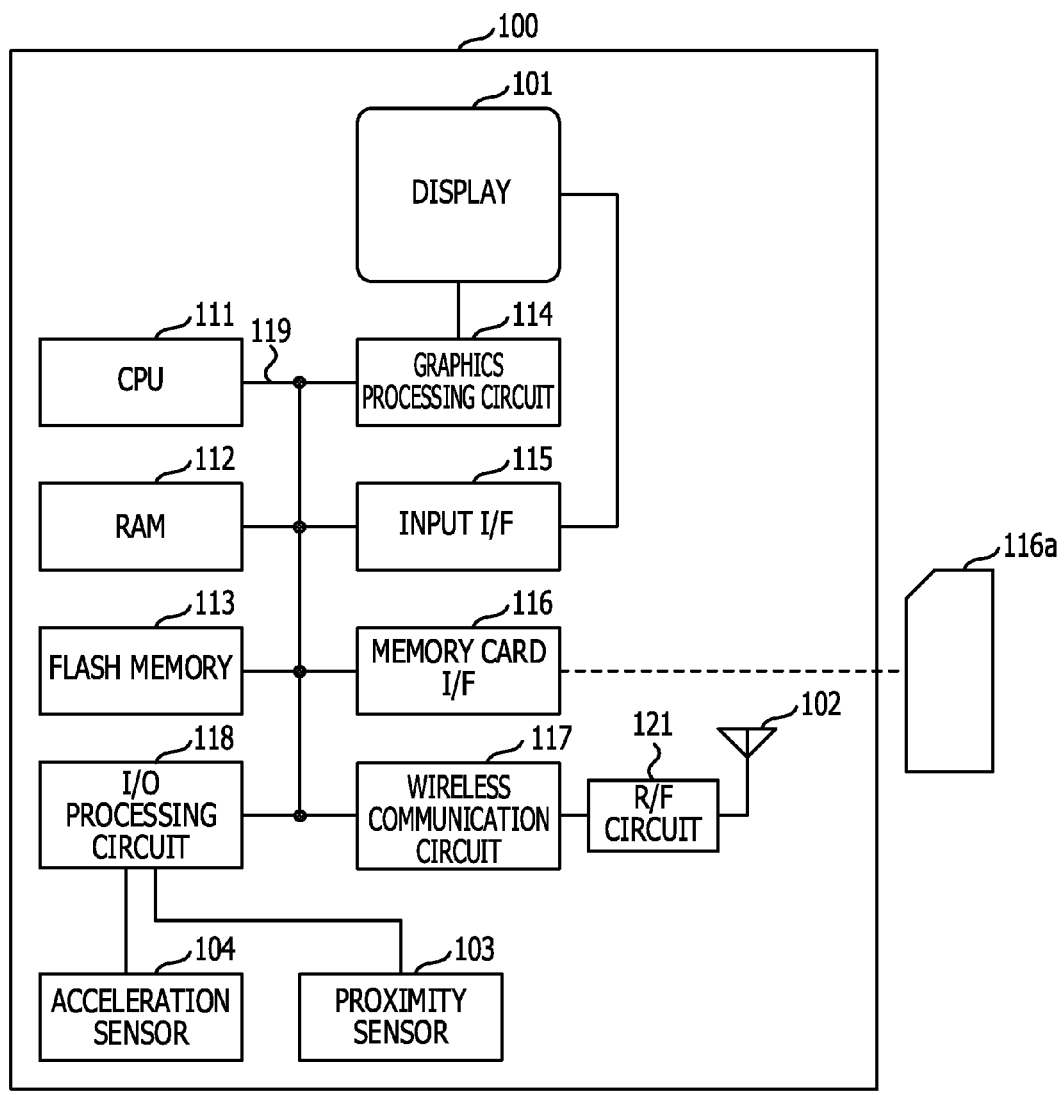
FIG. 2 is a diagram illustrating an example of the hardware configuration of the wireless communication apparatus according to one embodiment.
Figure 3:
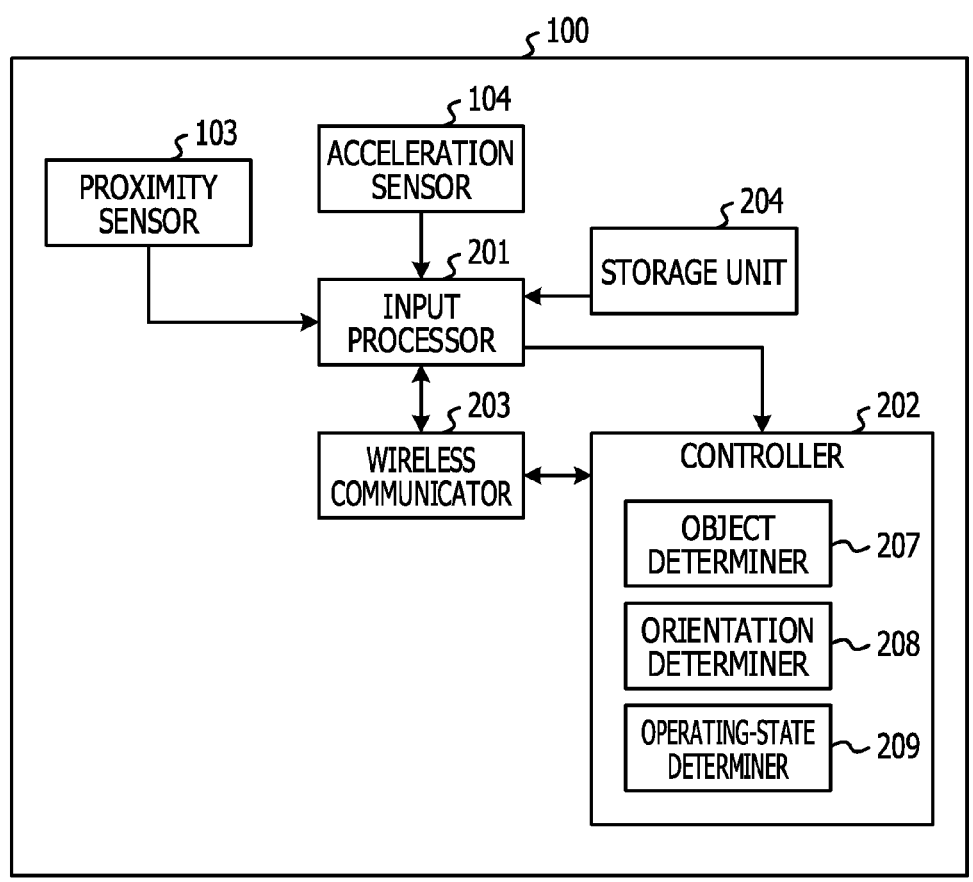
FIG. 3 is a diagram illustrating an example of the functional configuration of the wireless communication apparatus according to one embodiment.

An overview of a wireless communication apparatus according to the present disclosure will first be described with reference to FIGS. 1 to 3. FIG. 1 illustrates an example of the outer shape of a wireless communication apparatus 100 according to one embodiment. The wireless communication apparatus 100 according to the present embodiment is, for example, a tablet terminal that can be carried by a user. The wireless communication apparatus 100, however, is not limited to a tablet terminal and may be any electronic equipment including wireless communication functions of a smartphone, a mobile phone, a notebook PC, or the like.

The wireless communication apparatus 100 may be driven by, for example, a power supply of a built-in battery. A housing 100a of the wireless communication apparatus 100 has a generally flat-plate shape, and a touch panel display 101 is provided on an obverse surface (upper surface) of the housing 100a.

The wireless communication apparatus 100 has a wireless communication function. The wireless communication apparatus 100 performs wireless communication, for example, through a wireless wide-area network for 3rd generation (3G) mobile phones. The wireless communication apparatus 100 has, in or on the housing 100a, a communication antenna 102 for performing wireless communication. In the example illustrated in FIG. 1, the communication antenna 102 is provided at a position adjacent to an outer edge portion of the housing 100a.

The wireless communication apparatus 100 has a proximity sensor integrated circuit (IC) (hereinafter referred to as a "proximity sensor 103") and an acceleration sensor IC (hereinafter referred to as an "acceleration sensor 104"). Upon obtaining a detection value indicating whether or not an object has approached near or exists near the wireless communication apparatus 100 out of contact, that is, without actual contact, the proximity sensor 103 converts the detection value into an electrical signal and outputs the electrical signal. Major systems of the proximity sensor 103 include an induction type, an electrostatic capacitance type, an ultrasonic type, an electromagnetic wave type, an infrared type, and so on.

The acceleration sensor 104 converts a detection value indicating acceleration (the rate of speed change) of an object into an electrical signal and outputs the electrical signal. The acceleration sensor 104 detects the orientation (tilt) about each of triaxial (X, Y, Z) directions of the wireless communication apparatus 100. The acceleration sensor 104 may also be replaced with a gravity sensor or an infrared sensor for detecting the tilt of the wireless communication apparatus 100. However, when the wireless communication apparatus 100 is a tablet terminal, a smartphone, or the like for which reductions in the thickness and weight are requested, providing a new sensor does not meet users' request in terms of the structure (that is, the thickness and weight of the wireless communication apparatus 100 are not reduced) and cost. Hence, controlling the transmit power of a radio wave by using the existing sensors (the proximity sensor 103 and the acceleration sensor 104) provided in the wireless communication apparatus 100 makes it possible to reduce the thickness and the weight of the wireless communication apparatus 100 and also makes it possible to inhibit an increase in the cost of the wireless communication apparatus 100.

[Hardware Configuration of Wireless Communication Apparatus]

Next, the hardware configuration of the wireless communication apparatus 100 according to one embodiment will be described with reference to FIG. 2. FIG. 2 illustrates an example of the hardware configuration of the wireless communication apparatus 100 according to one embodiment.

A central processing unit (CPU) 111 controls the entire wireless communication apparatus 100. A random access memory (RAM) 112 and a plurality of pieces of peripheral equipment are coupled to the CPU 111 through a bus 119.

The RAM 112 is used as a main storage device in the wireless communication apparatus 100. At least part of an operating system (OS) program and application programs executed by the CPU 111 are temporarily stored in the RAM 112. Various types of data used for controlling the CPU 111 are stored in the RAM 112.

The pieces of peripheral equipment coupled to the bus 119 include a flash memory 113, a graphics processing circuit 114, an input interface (I/F) 115, a memory card interface 116, a wireless communication circuit 117, and an input/output (I/O) processing circuit 118.

The flash memory 113 is used as a secondary storage device for the wireless communication apparatus 100. The OS program, and application programs, and various types of data are stored in the flash memory 113. The secondary storage device may be implemented by another type of nonvolatile storage device, such as a hard disk drive (HDD).

The display 101 is coupled to the graphics processing circuit 114. The graphics processing circuit 114 displays an image on the display 101 in accordance with an instruction from the CPU 111.

A touch panel 101a is provided on a display plane of the display 101 as an input device and is coupled to the input interface 115. The input interface 115 sends a signal, output from the touch panel 101a, to the CPU 111.

A memory card 116a, which is a portable storage device employing a flash memory or the like as a storage device, is coupled to the memory card interface 116. The memory card interface 116 outputs data, read from the memory card 116a, to the CPU 111. The memory card interface 116 writes data, for which a write request is issued from the CPU 111, to the memory card 116a.

The wireless communication circuit 117 performs wireless communication through a wireless wide-area network for 3G mobile phones. The wireless communication circuit 117 is coupled to a communication antenna 102 via a radio-frequency (R/F) circuit 121 and transmits/receives a radio wave by using the communication antenna 102. The R/F circuit 121 controls the transmit power of the radio-wave output from the communication antenna 102, by adjusting a voltage output from the wireless communication circuit 117 to the communication antenna 102. The wireless communication circuit 117 may also be a circuit that performs wireless communication, for example, by using another system for performing communication through a wireless wide-area network, such as Worldwide Interoperability for Microwave Access (WiMAX).

The I/O processing circuit 118 is a circuit that enables transmission/reception of information between the CPU 111 and another device. The wireless communication circuit 117, the proximity sensor 103, and the acceleration sensor 104 are coupled to the I/O processing circuit 118. In response to a request from the CPU 111, the I/O processing circuit 118 causes the wireless communication circuit 117 to control the transmit power of the radio-wave output from the communication antenna 102 via the R/F circuit 121.

The I/O processing circuit 118 inputs a detection value of the proximity sensor 103 and a detection value of the acceleration sensor 104 and sends the detection values to the CPU 111.

[Functional Configuration of Wireless Communication Apparatus]

Next, an example of the functional configuration of the wireless communication apparatus 100 according to one embodiment will be described with reference to FIG. 3. FIG. 3 illustrates an example of the functional configuration of the wireless communication apparatus 100 according to one embodiment. The wireless communication apparatus 100 has an input processor 201, a controller 202, a wireless communicator 203, and a storage unit 204.

The input processor 201 inputs the detection value from the proximity sensor 103 and the detection value from the acceleration sensor 104. The functions of the input processor 201 are mainly realized by the I/O processing circuit 118. The controller 202 has an object determiner 207, an orientation determiner 208, and an operating-state determiner 209.

Figure 4A:
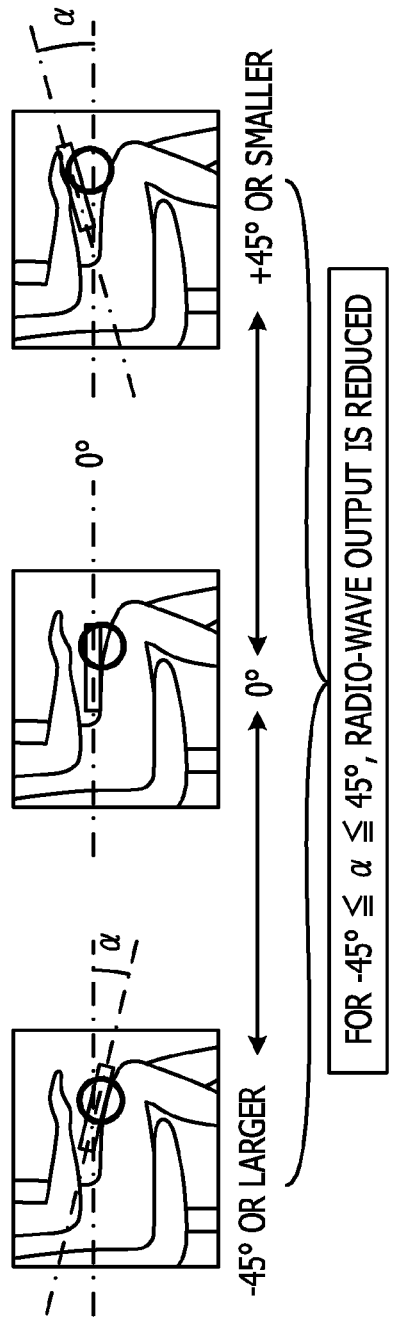
FIGS. 4A and 4B illustrate a control example of radio-wave output using an acceleration sensor according to one embodiment.
Figure 4B:
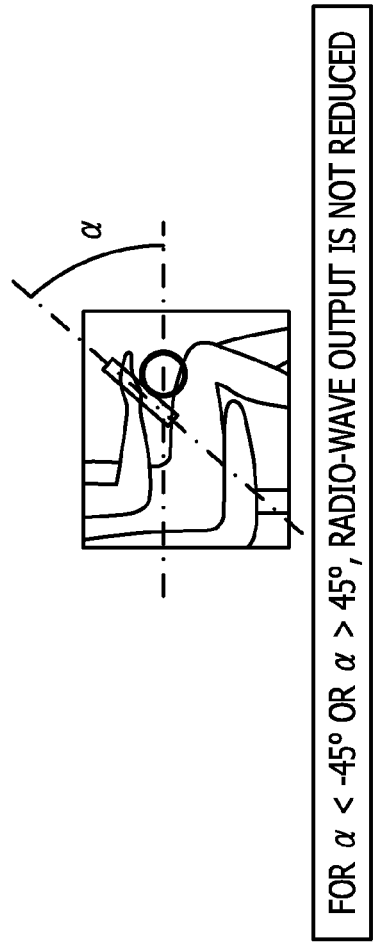

Based on the detection value from the proximity sensor 103, the object determiner 207 directly determines whether or not an object that is proximate to the wireless communication apparatus 100 exists. As illustrated in FIGS. 4A and 4B, the acceleration sensor 104 detects a tilt $\alpha$ of the wireless communication apparatus 100. Based on the detection value of the acceleration sensor 104, the orientation determiner 208 determines the orientation of the wireless communication apparatus 100, to thereby make it possible to indirectly determine whether or not an object that is proximate to the wireless communication apparatus 100 exists.

For example, when the tilt $\alpha$ is in the range of $-45°$ to $45°$, as illustrated in FIG. 4A, the orientation determiner 208 determines that the wireless communication apparatus 100 is operated by a human. Thus, it is indirectly determined that the human body is proximate to the wireless communication apparatus 100. In order to ensure that the human body is not adversely affected, it is desired to perform control so as to reduce the transmit power of the radio wave of the wireless communication apparatus 100. That is, control is performed so that the output level is lower than or equal to a predetermined first threshold.

On the other hand, when the tilt $\alpha$ is smaller than $-45°$ or is larger than $45°$, as illustrated in FIG. 4B, the orientation determiner 208 determines that the wireless communication apparatus 100 is not operated by a human. Thus, it is indirectly determined that no human body is proximate to the wireless communication apparatus 100. Since no human body is present near the wireless communication apparatus 100, it is desired to perform control so as to increase the transmit power of the radio wave of the wireless communication apparatus 100 (that is, to perform control so that the output level is higher than or equal to a predetermined second threshold).

The operating-state determiner 209 determines the operation (normal or anomalous) state of the proximity sensor 103. When the detection value of the proximity sensor 103 is the constant for a predetermined time or more, the operating-state determiner 209 may reset the proximity sensor 103 and determine the operating state of the reset proximity sensor 103. When the detection value of the proximity sensor 103 is the constant for the predetermined time or more, the operating-state determiner 209 may determine the operating state of the proximity sensor 103, based on the detection value of the proximity sensor 103 and the detection value of the acceleration sensor 104. The functions of the object determiner 207, the orientation determiner 208, and the operating-state determiner 209, which are included in the controller 202, are mainly realized by the CPU 111.

The wireless communicator 203 controls the transmit power of the radio wave, based on the result of the determination as to whether or not an object that is proximate to the wireless communication apparatus 100 exists. When it is determined that the reset proximity sensor 103 is in an anomalous state, the wireless communicator 203 may determine the orientation of the wireless communication apparatus 100, based on the detection value from the acceleration sensor 104, and may control the transmit power of the radio wave, based on a result of the determination. The functions of the wireless communicator 203 are mainly realized by the wireless communication circuit 117.

At least part of the OS program and application programs executed by the controller 202 are stored in the storage unit 204. Various types of data used for processing performed by the controller 202 are stored in the storage unit 204. The functions of the storage unit 204 are mainly realized by the RAM 112 and the flash memory 113.

First Embodiment

[Power Control Processing]

Figure 5A:
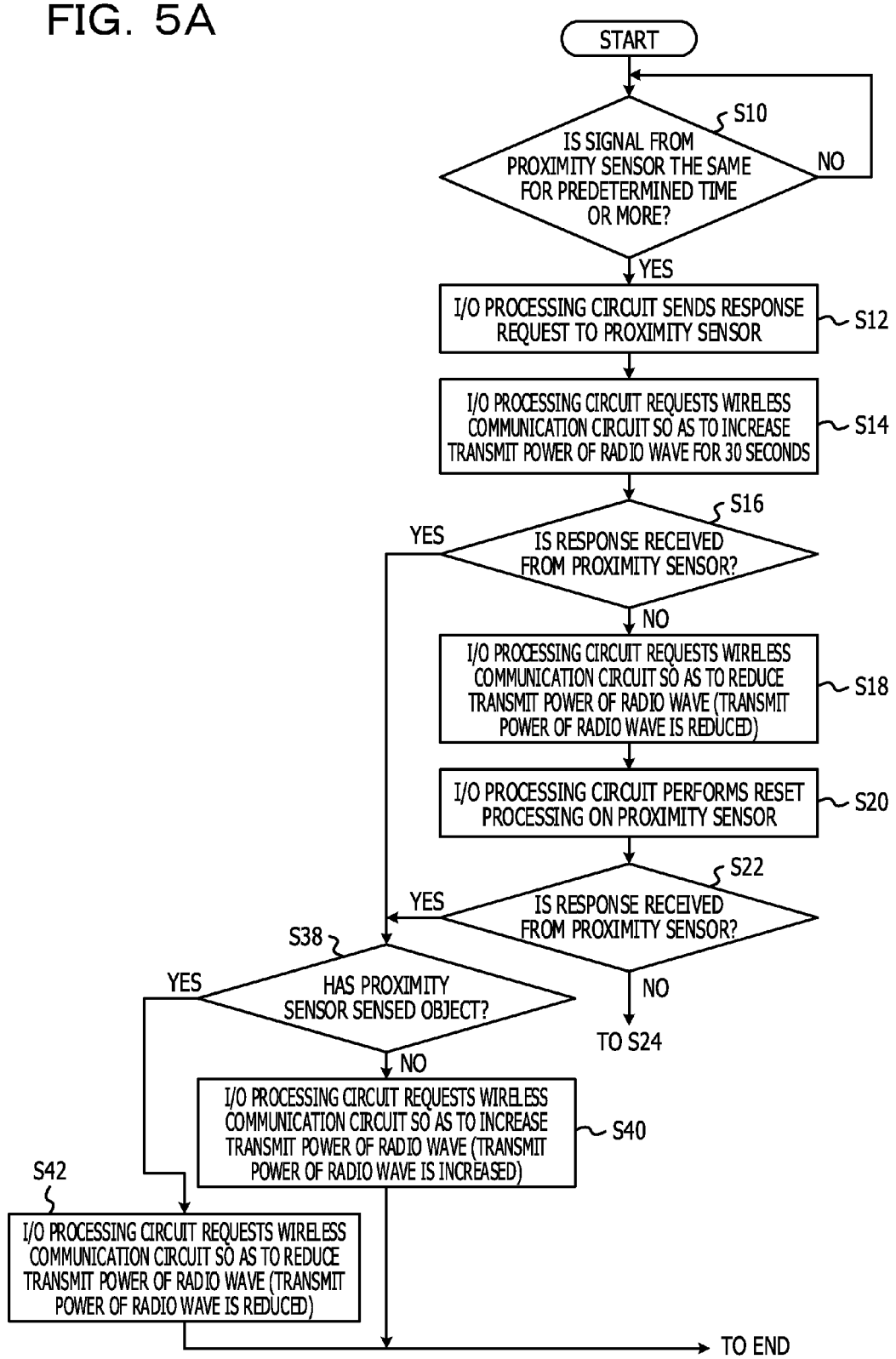

Next, power control processing performed by the wireless communication apparatus 100 according to a first embodiment will be described with reference to FIGS. 5A and 5B. FIGS. 5A and 5B illustrate is a flowchart illustrating the power control processing performed by the wireless communication apparatus 100 according to the first embodiment.

A premise in the present embodiment is that the proximity sensor 103 has an inter-integrated circuit (I2C) interface or a Universal Serial Bus (USB) interface. That is, the I/O processing circuit 118 issues a response request to the proximity sensor 103 via the I2C interface or the USB interface.

When the signal from the proximity sensor 103 is the constant for a predetermined time or more, it is determined that there is a possibility that the proximity sensor 103 has a failure. Cases in which it is determined that there is a possibility that the proximity sensor 103 has a failure include a case in which the OS (a device manager managed by the OS) of the wireless communication apparatus 100 does not recognize the proximity sensor 103 and a case in which the OS recognizes the proximity sensor 103. One example of a case in which the OS does not recognize the proximity sensor 103 is a case in which the OS and the proximity sensor 103 are not coupled to each other. On the other hand, when the OS recognizes the proximity sensor 103, the OS and the proximity sensor 103 are coupled to each other. Under the control of the OS, the I/O processing circuit 118 sends a response request to the proximity sensor 103 and waits for a response from the proximity sensor 103.

When no response to the response request is received from the proximity sensor 103, the I/O processing circuit 118 may determine that the proximity sensor 103 is in an anomalous state. On the other hand, when a response to the response request is received from the proximity sensor 103, the I/O processing circuit 118 may determine that the proximity sensor 103 is in a normal state.

Based on the premise described above, the power control processing in FIGS. 5A and 5B is started when the power supply of the wireless communication apparatus 100 is turned on. First, in step S10, the I/O processing circuit 118 (the input processor 201) determines whether or not the signal from the proximity sensor 103 is the constant for a predetermined time or more. The I/O processing circuit 118 repeats the process in steps S10 until it is determined that the signal from the proximity sensor 103 is the constant for the predetermined time or more. Upon determining, in step S10, that the signal from the proximity sensor 103 is the constant for the predetermined time or more, the process proceeds to step S12 in which the I/O processing circuit 118 sends a response request to the proximity sensor 103.

Next, in step S14, the I/O processing circuit 118 issues, to the wireless communication circuit 117, a request for increasing the transmit power of the radio wave for 30 seconds. In response to the request, the wireless communication circuit 117 (the wireless communicator 203) controls the R/F circuit 121 so as to increase the transmit power of the radio wave for 30 seconds.

Next, in step S16, the I/O processing circuit 118 determines whether or not a response is received from the proximity sensor 103 within a pre-defined time. If a response is received from the proximity sensor 103 within the pre-defined time, the I/O processing circuit 118 determines that the state of the proximity sensor 103 is normal.

Radio-wave transmit-power control using the proximity sensor 103 is executed. More specifically, the process proceeds to step S38, and the CPU 111 (the object determiner 207) determines whether or not the proximity sensor 103 has sensed an object, that is, whether or not an object is near the wireless communication apparatus 100, based on the detection value from the proximity sensor 103. When the proximity sensor 103 has sensed an object, the I/O processing circuit 118 issues a request for reducing the transmit power of the radio wave to an output level that satisfies communication specifications of the SAR, the FCC, and so on, considering influences on the human body. In response to the request, the wireless communication circuit 117 controls the R/F circuit 121 so as to reduce the transmit power of the radio wave.

When the CPU 111 (the object determiner 207) determines that no object has approached near the wireless communication apparatus 100 based on the detection value from the proximity sensor 103, the I/O processing circuit 118 issues a request for increasing the transmit power of the radio wave, since influences on the human body may be disregarded. In response to the request, the wireless communication circuit 117 controls the R/F circuit 121 so as to increase the transmit power of the radio wave.

When no response is received from the proximity sensor 103 within the pre-defined time in step S16, the I/O processing circuit 118 determines that the state of the proximity sensor 103 is anomalous. In this case, whether or not an object is near the wireless communication apparatus 100 is unknown. Accordingly, in step S18, the I/O processing circuit 118 issues a request for reducing the transmit power of the radio wave to an output level that satisfies the communication specifications of the SAR, the FCC, and so on, considering possible influences on the human body.

Next, in step S20, the I/O processing circuit 118 performs reset processing on the proximity sensor 103. The reset processing is performed considering that the object sensing using the proximity sensor 103 is to directly sense proximity of an object and has a higher sensing accuracy than that of indirect human-body sensing using the acceleration sensor 104 based on the orientation of the wireless communication apparatus 100.

That is, since the acceleration sensor 104 has its original usage other than sensing an object, it is provided in the wireless communication apparatus 100. For example, it is assumed that the acceleration sensor 104 is used to sense a shock on the wireless communication apparatus 100 to stop an HDD, in order to perform control so that the HDD is not damaged. It is assumed that the acceleration sensor 104 is used to detect the position of an object to be sensed, the position being used in software for a map application, or to obtain movement information.

In the present embodiment, the acceleration sensor 104, which is provided in the wireless communication apparatus 100, is used assuming the above-described usage method and so on, to detect the distance between the human body and the wireless communication apparatus 100 in a pseudo manner, when the proximity sensor 103 is broken. That is, in the present embodiment, as illustrated in FIGS. 4A and 4B, the distance between the human body and the wireless communication apparatus 100 is detected in a pseudo manner, based on the angle (the orientation and tilt) of the wireless communication apparatus 100, the angle being determined according to the detection value from the acceleration sensor 104. More specifically, when a human operates the wireless communication apparatus 100, the wireless communication apparatus 100 is at an angle in a predetermined range (in FIG. 4A, in the range of −45° to 45°. Thus, when the angle of the wireless communication apparatus 100, the angle being determined according to the detection value from the acceleration sensor 104, is at an angle in the range of ±45°, it may be determined that the human body and the wireless communication apparatus 100 are near each other. In the case of other angles, it may be determined that the human body and the wireless communication apparatus 100 are distant from each other.

Thus, in the present embodiment, the proximity sensor 103 that can directly determine whether or not an object is near the wireless communication apparatus 100 is used with higher priority. That is, even when it is determined that the state of the proximity sensor 103 is anomalous, recovery processing for using the proximity sensor 103 is performed with higher priority, without immediately switching to the acceleration sensor 104 to sense an object. As a result, when it is confirmed that the proximity sensor 103 has no failure or a failure in the proximity sensor 103 is cleared, object sensing is performed using the proximity sensor 103 without switching to the acceleration sensor 104. When it is confirmed that the proximity sensor 103 remains broken and does not operate in a normal manner even when the recovery processing for the proximity sensor 103 is performed, the acceleration sensor 104 is used in order to determine whether or not an object is near the wireless communication apparatus 100.

In this case, one example of the recovery processing for the proximity sensor 103 is reset processing by which the I/O processing circuit 118 sends a reset signal to the proximity sensor 103, as illustrated in step S20. Another example of the recovery processing is processing by which the I/O processing circuit 118 turns off the power of the proximity sensor 103 and then turns on the power supply of the proximity sensor 103 again.

After step S20 is executed, the process proceeds to step S22 in which the I/O processing circuit 118 checks whether or not a response from the proximity sensor 103 after the reset processing is received. If the I/O processing circuit 118 determines that a response from the proximity sensor 103 is received, the process proceeds to step S38, and the I/O processing circuit 118 controls the transmit power of the radio wave, based on the detection value of the proximity sensor 103 (steps S38 to S42).

On the other hand, if the I/O processing circuit 118 determines that no response is received from the proximity sensor 103, the process proceeds to step S24, and the I/O processing circuit 118 checks a response from the acceleration sensor 104. Next, in step S26, the I/O processing circuit 118 determines whether or not a response from the acceleration sensor 104 is received.

If the I/O processing circuit 118 determines, in step S26, that no response is received from the acceleration sensor 104, the process proceeds to step S36. In step S36, since the I/O processing circuit 118 fails to determine whether or not an object is proximate to the wireless communication apparatus 100, the I/O processing circuit 118 performs control so as to maintain the reduced transmit power of the radio wave, considering influences on the human body. Thereafter, the I/O processing circuit 118 ends this processing.

On the other hand, if the I/O processing circuit 118 determines, in step S26, that a response from the acceleration sensor 104 is received, the process proceeds to step S28 in which the CPU 111 (the orientation determiner 208) determines whether or not the tilt (angle) of the wireless communication apparatus 100 is in the range of −45° to 45°. If the CPU 111 determines, in step S28, that the tilt of the wireless communication apparatus 100 is in the range of −45° to 45°, the I/O processing circuit 118 determines that the human body is proximate to the wireless communication apparatus 100. In step S30, the I/O processing circuit 118 performs control so as to maintain the reduced transmit power of the radio wave, and then the process proceeds to step S34.

On the other hand, if the CPU 111 determines, in step S28, that the tilt of the wireless communication apparatus 100 is smaller than −45° or is larger than 45°, the I/O processing circuit 118 determines that the human body is not proximate to the wireless communication apparatus 100. In step S32, the I/O processing circuit 118 performs control so as to increase the transmit power of the radio wave, and the process proceeds to step S34.

In step S34, the I/O processing circuit 118 obtains a detection value (tilt information) from the acceleration sensor 104 until the power supply of the wireless communication apparatus 100 is turned off, and the process returns to step S28. As described above, when the proximity sensor 103 does not return to its normal state, steps S28 to S34 are executed until the power supply of the wireless communication apparatus 100 is turned off, and the acceleration sensor 104 is used to control the transmit power of the radio wave.

As described above, according to the power control processing performed by the wireless communication apparatus 100 in the first embodiment, the transmit power of the radio wave of the wireless communication apparatus 100 can be controlled according to the operating state of the proximity sensor 103 provided in the wireless communication apparatus 100.

For example, when the signal from the proximity sensor 103 is the constant for the predetermined time or more during wireless communication, the recovery processing, such as transmission of a response request to the proximity sensor 103 and the reset processing, is performed first. As a result, when the proximity sensor 103 returns to its normal state, the transmit power of the radio wave is controlled using the proximity sensor 103. On the other hand, when the proximity sensor 103 does not return to its normal state even when the recovery processing, such as the reset processing, is performed, the transmit power of the radio wave is controlled using the acceleration sensor 104.

As described above, in the present embodiment, based on the characteristics of the existing sensors provided in the wireless communication apparatus 100, it is possible to perform control so that wireless communication is performed while considering influences on the human body. That is, since the power control is performed using the proximity sensor 103 with higher priority, when the signal from the proximity sensor 103 is the constant for the predetermined time, whether or not the state is caused by a fault is determined using the functions of the I2C and the reset processing. When the result of the determination indicates that the proximity sensor 103 is in a normal state, it is possible to control the transmit power of the radio wave so as to satisfy the communication standard, by using the proximity sensor 103. In addition, even when the proximity sensor 103 is in an anomalous state, it is possible to control the transmit power of the radio wave so as to satisfy the communication standard, by using the acceleration sensor 104 provided in the wireless communication apparatus 100.

Second Embodiment

[Power Control Processing]

Figure 6B:
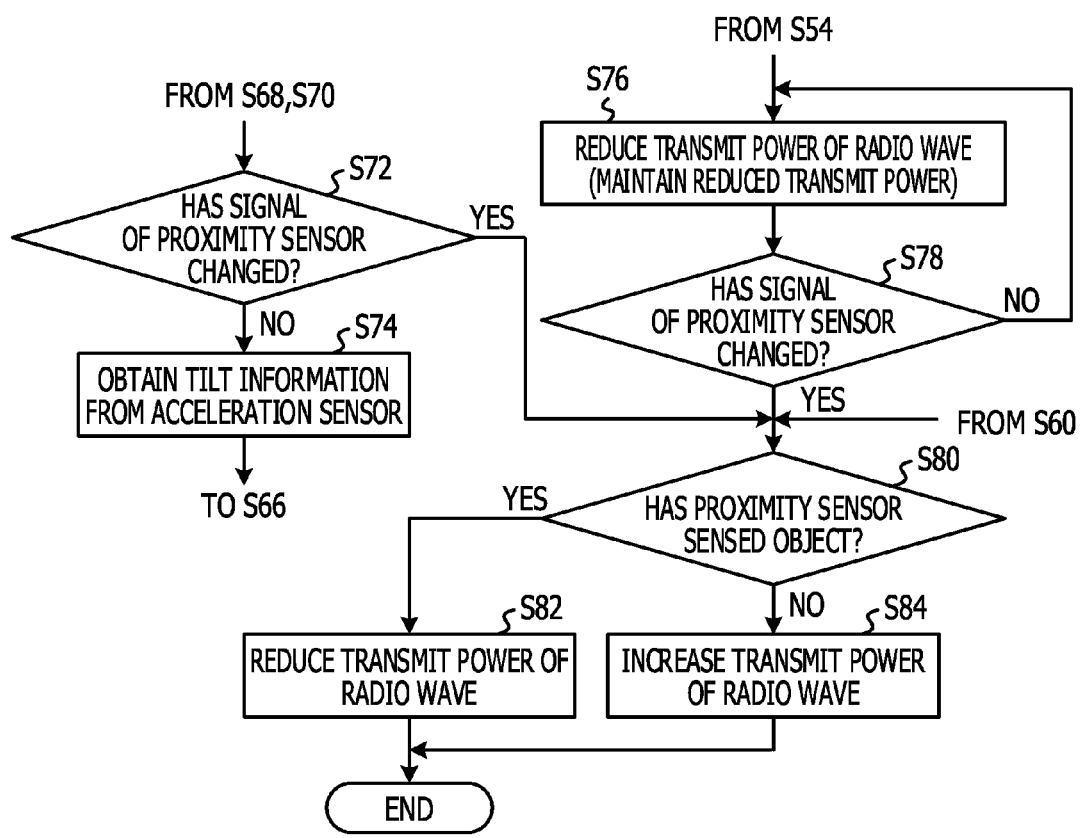

Next, power control processing performed by the wireless communication apparatus 100 according to a second embodiment will be described with reference to FIGS. 6A and 6B. FIGS. 6A and 6B illustrate a flowchart illustrating the power control processing performed by the wireless communication apparatus 100 according to the second embodiment.

A premise in the present embodiment is that the proximity sensor 103 has neither an I2C interface nor a USB interface. Thus, in the present embodiment, since neither an I2C interface nor a USB interface is provided, a response from the proximity sensor 103 is not received, even the I/O processing circuit 118 issues a response request to the proximity sensor 103.

However, in the case of the present embodiment, when the signal from the proximity sensor 103 is the constant for a predetermined time or more, the control of the transmit power of the radio wave by immediately switching the sensor from the proximity sensor 103 to the acceleration sensor 104 is not performed. That is, when the signal from the proximity sensor 103 is the constant for a predetermined time or more, the detection value from the proximity sensor 103 and the detection value from the acceleration sensor 104 are used to determine whether or not the state of the proximity sensor 103 is normal or anomalous. When the result of the determination indicates that the proximity sensor 103 is in an anomalous state, the sensor for power control is switched to the acceleration sensor 104. The points described above are main points different between the power control processing according to the first embodiment and the power control processing according to the second embodiment.

When the power supply of the wireless communication apparatus 100 is turned on, the power control processing in FIGS. 6A and 6B is started, and first, in step S50, the I/O processing circuit 118 (the input processor 201) determines whether or not the signal from the proximity sensor 103 is the constant for a predetermined time or more. The I/O processing circuit 118 repeats the process in step S50, until it determines that the signal from the proximity sensor 103 is the constant for the predetermined time or more. If the I/O processing circuit 118 determines, in step S50, that the signal from the proximity sensor 103 is the constant for the predetermined time or more, the process proceeds to step S52 in which the I/O processing circuit 118 checks a response from the acceleration sensor 104.

Next, in step S54, the I/O processing circuit 118 determines whether or not a response from the acceleration sensor 104 is received within a predetermined time. If the I/O processing circuit 118 determines, in step S54, that no response from the acceleration sensor 104 is received within the predetermined time, the process proceeds to step S76 in which the CPU 111 reduces the transmit power of the radio wave.

Next, the process proceeds to step S78 in which the I/O processing circuit 118 determines that the signal of the proximity sensor 103 has changed. If the signal of the proximity sensor 103 has changed, the I/O processing circuit 118 determines that the proximity sensor 103 is in the normal state, and switches the sensor for the power control from the acceleration sensor 104 to the proximity sensor 103. That is, if the I/O processing circuit 118 determines the result is "Yes" in step S78, the process proceeds to step S80 in which the I/O processing circuit 118 determines whether or not the proximity sensor 103 has sensed an object.

If the I/O processing circuit 118 determines, in step S80, that the proximity sensor 103 has sensed an object, the CPU 111 reduces the transmit power of the radio wave in step S82 and ends this processing. If the I/O processing circuit 118 determines, in step S80, that the proximity sensor 103 has not sensed an object, the CPU 111 increases the transmit power of the radio wave in step S84 and ends this processing. As described above, when the proximity sensor 103 returns to its normal state, the proximity sensor 103 including a higher accuracy for sensing an object is used with higher priority.

If the I/O processing circuit 118 determines, in step S54, that a response from the acceleration sensor 104 is received, the process proceeds to step S56 in which the CPU 111 (the orientation determiner 208) determines whether or not the tilt of the wireless communication apparatus 100 (angle) is in the range of −45° to 45°. If the CPU 111 determines, in step S56, that the tilt of the wireless communication apparatus 100 is in the range of −45° to 45°, the process proceeds to step S58 in which the I/O processing circuit 118 determines whether or not the proximity sensor 103 has sensed an object.

If The CPU 111 determines in step S56 that the tilt of the wireless communication apparatus 100 is in the range of −45° to 45° and it is determined in step S58 that the proximity sensor 103 has sensed an object, The CPU 111 determines that the human body is proximate to the wireless communication apparatus 100, based on the detection values of the acceleration sensor 104 and the proximity sensor 103. In such a case, based on the detection values of the acceleration sensor 104 and the proximity sensor 103, The CPU 111 determines that the proximity sensor 103 is in its normal state. Thus, the process proceeds to step S60 in which the CPU 111 determines that the proximity sensor 103 is operating in a normal manner, and the process proceeds to step S80. Thereafter, processes in steps S80 to S84 are executed.

On the other hand, if The CPU 111 determines in step S56 that the tilt of the wireless communication apparatus 100 is in the range of −45° to 45° and it is determined in step S58 that the proximity sensor 103 has not sensed an object, a contradicting determination result is obtained from the detection values of the acceleration sensor 104 and the proximity sensor 103. That is, it is determined that the human body is proximate to the wireless communication apparatus 100, based on the detection value of the acceleration sensor 104, and The CPU 111 determines that no object is proximate to the wireless communication apparatus 100, based on the detection value of the proximity sensor 103. When a contradicting determination result is obtained in the manner described above, The CPU 111 determines that the proximity sensor 103 is in an anomalous state. Thus, in this case, the wireless communication apparatus 100 according to the present embodiment switches the sensor that provides a trigger for controlling the transmit power of the radio wave from the proximity sensor 103 to the acceleration sensor 104, and performs radio-wave transmit-power control in accordance with the tilt information of the acceleration sensor 104.

More specifically, if The CPU 111 determines in step S56 that the tilt of the wireless communication apparatus 100 is in the range of −45° to 45° and The CPU 111 determines in step S58 that the proximity sensor 103 has not sensed an object, the process proceeds to step S62. The CPU 111 (the controller 202) determines that the state of the proximity sensor 103 is anomalous. The I/O processing circuit 118 then obtains the tilt information of the acceleration sensor 104. If the CPU 111 determines, in step S66, that the tilt of the wireless communication apparatus 100 is in the range of −45° to 45°, the process proceeds to step S68 in which the CPU 111 reduces the transmit power of the radio wave, and the process proceeds to step S72. If the CPU 111 determines, in step S66, that the tilt of the wireless communication apparatus 100 is smaller than −45° or is larger than 45°, the process proceeds to step S70 in which the CPU 111 increases the transmit power of the radio wave, and the process proceeds to step S72.

Next, in step S72, the I/O processing circuit 118 determines whether or not the signal of the proximity sensor 103 has changed. If it is determined that the signal of the proximity sensor 103 has changed, it is determined that the proximity sensor 103 is in its normal state, and the sensor for the power control is switched from the acceleration sensor 104 to the proximity sensor 103. That is, the process proceeds to step S80 in which the I/O processing circuit 118 determines whether or not the proximity sensor 103 has sensed an object. If the I/O processing circuit 118 determines, in step S80, that the proximity sensor 103 has sensed an object, the CPU 111 reduces the transmit power of the radio wave in step S82 and ends this processing. If the I/O processing circuit 118 determines, in step S80, that the proximity sensor 103 has not sensed an object, the CPU 111 increases the transmit power of the radio wave in step S84 and ends this processing. As described above, when the proximity sensor 103 returns to its normal state, the proximity sensor 103 is used with higher priority.

If the I/O processing circuit 118 determines, in step S72, that the signal of the proximity sensor 103 has not changed, the process proceeds to step S74 in which the CPU 111 obtains the tilt information of the acceleration sensor 104. Thereafter, the process returns to step S66, and the processes in steps S66 to S74 are repeated. The processes in steps S66 to S74 are repeated until the power supply of the wireless communication apparatus 100 is turned off or the proximity sensor 103 returns its normal state.

If the I/O processing circuit 118 determines, in step S54, that a response from the acceleration sensor 104 is received, and the CPU 111 determines, in step S56, that the tilt of the wireless communication apparatus 100 is smaller than −45° or is larger than 45°, the process proceeds to step S64. In step S64, the I/O processing circuit 118 determines whether or not the proximity sensor 103 has sensed an object.

If The CPU 111 determines in step S56 that the tilt of the wireless communication apparatus 100 is not in the range of −45° to 45° and The CPU 111 determines in step S64 that the proximity sensor 103 has not sensed an object, a matching determination result is obtained from the detection values of the acceleration sensor 104 and the proximity sensor 103. That is, The CPU 111 determines that no human body is proximate to the wireless communication apparatus 100, based on the detection value of the acceleration sensor 104, and it is determined that no object is proximate to the wireless communication apparatus 100, based on the detection value of the proximity sensor 103. When a matching determination result is obtained in the manner described above, it may be determined that the proximity sensor 103 is in its normal state. Thus, in this case, in step S60, the CPU 111 determines that the proximity sensor 103 is operating in a normal manner, and the process proceeds to step S80. Then, the processes in steps S80 to S84 are executed.

On the other hand, if The CPU 111 determines in step S56 that the tilt of the wireless communication apparatus 100 is not in the range of −45° to 45° and it is determined in step S64 that an object has been sensed based on the detection value of the proximity sensor 103, a contradicting determination result is obtained from the detection values of the acceleration sensor 104 and the proximity sensor 103. That is, The CPU 111 determines that the human body is not proximate to the wireless communication apparatus 100, based on the detection value of the acceleration sensor 104, and The CPU 111 determines that an object is proximate to the wireless communication apparatus 100, based on the detection value of the proximity sensor 103. When a contradicting determination result is obtained in the manner described above, The CPU 111 determines that the proximity sensor 103 is in an anomalous state. Thus, in this case, the wireless communication apparatus 100 according to the present embodiment switches the sensor that provides a trigger for controlling the transmit power of the radio wave from the proximity sensor 103 to the acceleration sensor 104, and performs the radio-wave transmit-power control in accordance with the tilt information of the acceleration sensor 104. More specifically, if The CPU 111 determines in step S56 that the tilt of the wireless communication apparatus 100 is not in the range of −45° to 45° and the I/O processing circuit 118 determines, in step S64, that the proximity sensor 103 has sensed an object, the process proceeds to step S62. The CPU 111 (the controller 202) determines that the proximity sensor 103 is anomalous. The I/O processing circuit 118 then obtains the tilt information of the acceleration sensor 104. Thereafter, the radio-wave transmit-power control in steps S66 to S74 is performed according to the tilt information of the acceleration sensor 104.

As described above, according to the power control processing performed by the wireless communication apparatus 100 according to the second embodiment, the transmit power of the radio wave of the wireless communication apparatus 100 can be controlled according to the operating state of the proximity sensor 103 provided in the wireless communication apparatus 100.

Since the wireless communication apparatus 100 according to the second embodiment does not have an interface, such as an I2C interface, the wireless communication apparatus 100 fails to receive a response from the proximity sensor 103, even when a response request or a reset signal is sent to the proximity sensor 103.

However, in the present embodiment, when The CPU 111 determines that the proximity sensor 103 has a failure, the sensor is not immediately switched to the acceleration sensor 104. That is, whether or not the sensor that provides a trigger for controlling the transmit power of the radio wave is to be switched from the proximity sensor 103 to the acceleration sensor 104 is determined based on the determination result of the state of the proximity sensor 103 and the determination result of the state of the acceleration sensor 104. When the result of the determination indicates that the proximity sensor 103 is in its normal state, the transmit power of the radio wave is controlled so as to satisfy the communication standard by using the proximity sensor 103. Even when the proximity sensor 103 is in an anomalous state, the transmit power of the radio wave is controlled so as to satisfy the communication standard by using the acceleration sensor 104 provided in the wireless communication apparatus 100.

The wireless communication apparatus has been described above in conjunction with the embodiments described above. However, the wireless communication apparatus according to the present disclosure is not limited to the embodiments described above, and various modifications and improvements are possible within the scope of the present disclosure. The items described in the embodiments described above may be combined within a scope that causes no contradiction. For example, the controller 202 may be implemented by hardware, may be implemented by software, or may be implemented by a combination of hardware and software.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless communication apparatus including a first sensor and a second sensor, the wireless communication apparatus comprising:
   a memory; and
   a processor coupled to the memory, configured to:
   input a detection value of the first sensor and a detection value of the second sensor;
   determine whether or not an object that is located at the wireless communication apparatus exists, based on the detection value of the first sensor;
   determine a gradient of the wireless communication apparatus, based on the detection value of the second sensor; and
   regulate transmit power of a radio wave, based on a determination by the first sensor,
   wherein, when the detection value of the first sensor is constant for a predetermined time, and the processor determines that the first sensor is in abnormal state in recovery processing on the first sensor, the processor increases the regulating transmit power of the radio wave, based on a determination by the second sensor.

2. The wireless communication apparatus according to claim 1,
   wherein, when the first sensor makes a response in response to the recovery processing on the first sensor, the processor increases the transmit power of the radio wave, based on the determination by the first sensor.

3. A wireless communication apparatus including a first sensor and a second sensor, the wireless communication apparatus comprising:
   a memory; and
   a processor coupled to the memory, configured to:
   input a detection value of the first sensor and a detection value of the second sensor;
   determine whether or not an object that is located at the wireless communication apparatus exists, based on the detection value of the first sensor;
   determine a gradient of the wireless communication apparatus, based on the detection value of the second sensor; and regulate transmit power of a radio wave, based on a determination by the first sensor, wherein, when the detection value of the first sensor is constant for a predetermined time, and the processor determines that the first sensor is in abnormal state in the determination by the first sensor and a determination by the second sensor, the regulating processor increases the transmit power of the radio wave, based on the determination by the second sensor.

4. The wireless communication apparatus according to claim 3, wherein, when the detection of the first sensor changes, the processor increases the transmit power of the radio wave, based on the determination by the first sensor.

5. A wireless communication apparatus including a first sensor and a second sensor, the wireless communication apparatus comprising:

a processor configured to:

input a detection value of the first sensor and a detection value of the second sensor;

determine whether or not an object that is located at the wireless communication apparatus exists, based on the detection value of the first sensor;

determine a gradient of the wireless communication apparatus, based on the detection value of the second sensor;

sending a first control signal for regulating transmit power of a radio wave, based on a determination by the first sensor; and sending a second control signal for increasing the regulating transmit power of the radio wave, based on a determination by the second sensor when the detection value of the first sensor is constant for a predetermined time, and that the first sensor is in abnormal state in recovery processing on the first sensor is determined, and RF circuit configured to regulate the transmit power of the radio wave based on the first control signal and to increase the regulating transmit power of the radio wave based on the second control signal.

\* \* \* \* \*